US012794688B2

(12) United States Patent
Jayaram

(10) Patent No.: US 12,794,688 B2
(45) Date of Patent: Nov. 10, 2026

(54) AGENTLESS COMPUTING CLUSTER BACKUP

(71) Applicant: Hewlett Packard Enterprise Development LP, Spring, TX (US)

(72) Inventor: Smitha Jayaram, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 246 days.

(21) Appl. No.: 18/406,702

(22) Filed: Jan. 8, 2024

(65) Prior Publication Data

US 2025/0132911 A1 Apr. 24, 2025

(30) Foreign Application Priority Data

Oct. 19, 2023 (IN) ............................ 202341071632

(51) Int. Cl.

| | |
|---|---|
| ***H04L 9/08*** | (2006.01) |
| ***G06F 11/1446*** | (2026.01) |
| ***H04L 9/00*** | (2022.01) |
| ***H04L 9/06*** | (2006.01) |

(52) U.S. Cl.

CPC ........ *H04L 9/0894* (2013.01); *G06F 11/1464* (2013.01); *H04L 9/06* (2013.01); *G06F 2201/805* (2013.01)

(58) Field of Classification Search

CPC ...... H04L 9/0894; H04L 9/06; G06F 11/1465; G06F 2201/805

USPC .......................................................... 713/153

See application file for complete search history.

(56) References Cited

U.S. PATENT DOCUMENTS 8,588,425 B1 * 11/2013 Harwood ............ G06F 12/1408 380/278
10,484,352 B2 * 11/2019 Manu ...................... H04L 63/06
10,826,689 B2 * 11/2020 Oliver .................... H04L 9/0822
11,755,425 B1 * 9/2023 Yadav ................. G06F 11/1435 711/162
2006/0005048 A1 * 1/2006 Osaki .................. G06F 21/6218 713/193
2008/0307020 A1 * 12/2008 Ko ...................... G06F 11/1458
2013/0103945 A1 * 4/2013 Cannon ............... G06F 21/6209 713/168
2016/0150047 A1 * 5/2016 O'Hare ............... G06F 11/1469 713/168
2018/0012028 A1 * 1/2018 Barbas .................. H04L 9/0861
2018/0225179 A1 * 8/2018 Donaghy ............ G06F 11/1448
2019/0081775 A1 * 3/2019 Oliver .................... H04L 63/064
2020/0177382 A1 * 6/2020 Perlman ..................... H04L 9/14
2020/0319810 A1 * 10/2020 Narayanamurthy .. G06F 21/602
2020/0320046 A1 * 10/2020 Narayanamurthy .. G06F 16/215
2023/0142346 A1 * 5/2023 Menezes ............. G06F 11/1451 711/162

* cited by examiner

*Primary Examiner* — Dereena T Cattungal

(74) *Attorney, Agent, or Firm* — Slater Matsil, LLP

(57) ABSTRACT

A computing cluster backup system securely backs up and restores secrets of a computing cluster. The computing cluster backup system includes a local backup server, which is in a same network as the computing cluster, and a remote backup server, which may be in a different geographic location than the local backup server. The local backup server encrypts secrets of the computing cluster, and sends the encrypted secrets to the remote backup server for offsite backup. The local backup server is separate from the computing cluster, and thus backup and restoration may be agentless.

20 Claims, 6 Drawing Sheets

200

AGENTLESS COMPUTING CLUSTER BACKUP

BACKGROUND

Container orchestration may be used for automating the deployment, scaling, and management of applications. A container management system may be used to perform container orchestration. A container management system may include a set of primitives that are collectively used for container orchestration across a computing cluster of computing nodes. A computing cluster includes one or more manager nodes (which are part of a control plane) and one or more worker nodes (which are part of a data plane). A manager node of a computing cluster can distribute workloads to worker nodes of the computing cluster, manage the transfer of workloads between the worker nodes, scale workloads up or down, and/or the like by orchestrating application containers on the worker nodes. Application containers are a form of operating system virtualization, where a container includes the minimum operating system resources, memory, and dependencies to run an application. Cluster data backup and restoration is one challenge of administering a container management system.

BRIEF DESCRIPTION OF THE DRAWINGS

Aspects of the present disclosure are best understood from the following detailed description when read with the accompanying FIGURES.

Corresponding numerals and symbols in the different FIGURES generally refer to corresponding parts unless otherwise indicated. The FIGURES are drawn to clearly illustrate the relevant aspects of the disclosure and are not necessarily drawn to scale.

DETAILED DESCRIPTION

Figure 1:
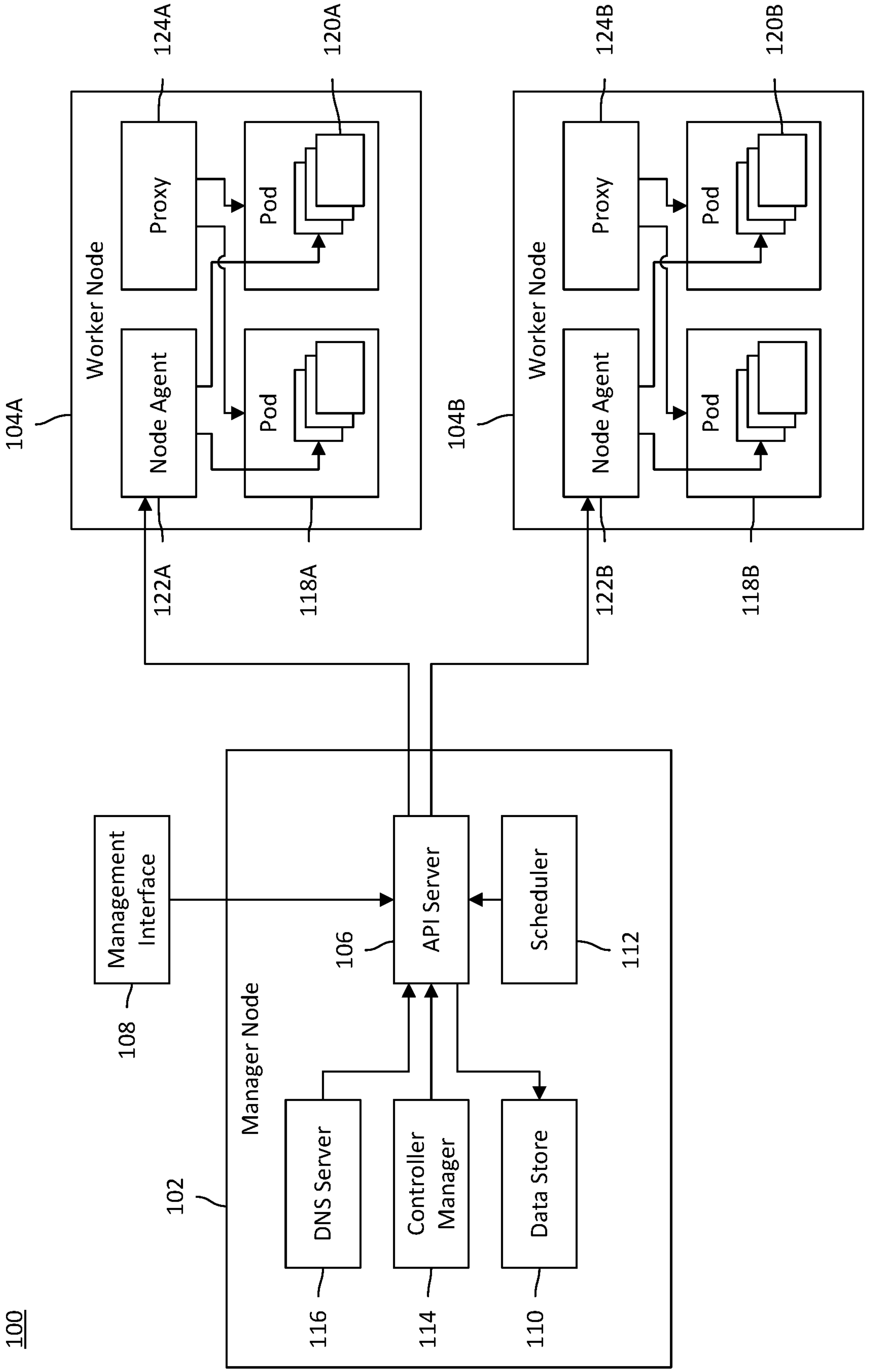
FIG. 1 is a schematic diagram of a computing cluster, according to some implementations.

The following disclosure provides many different examples for implementing different features. Specific examples of components and arrangements are described below to simplify the present disclosure. These are, of course, merely examples and are not intended to be limiting.

An application that is orchestrated on a computing cluster may use configuration data in order to operate. Additionally, the computing cluster itself may use configuration data for cluster operations. Some configuration data is sensitive. Examples of sensitive configuration data include authentication credentials (e.g., passwords, tokens, etc.), database connection strings, encryption certificates, API keys, and the like.

To avoid including sensitive configuration data in the code of an application, the sensitive configuration data may instead be securely stored in a computing cluster as one or more secrets. A secret is an object, stored in a data store of the computing cluster, that contains sensitive configuration data. A secret may be injected into an application container and/or accessed by the computing cluster at runtime. Secrets may be stored in plaintext, which presents a challenge to securely backing up and restoring the secrets, particularly for offsite backups.

The present disclosure describes a computing cluster backup system for securely backing up and restoring secrets of a computing cluster. The backup system includes a local backup server, which is in a same network as the computing cluster. The local backup server obtains plaintext secrets from the computing cluster, encrypts the plaintext secrets to obtain encrypted secrets, and then stores the encrypted secrets back on the computing cluster. The local backup server is separate from the computing nodes of the computing cluster, and thus does not run as an agent on the computing cluster. As a result, cluster data backup and restoration may be agentless, which may simplify administration of the computing cluster.

A remote backup server of the backup system retrieves the encrypted secrets from the computing cluster. The remote backup server is separate from the local backup server, and may be in a different geographic location than the local backup server. Thus, the secrets of the computing cluster may be backed up offsite from the computing cluster. Because the encrypted secrets (and not the plaintext secrets) are backed up offsite, sensitive configuration data may be protected and restored securely when needed.

In some implementations, envelope encryption is used to encrypt the secrets. The secrets may be encrypted by a symmetric-key algorithm. The data key used to encrypt the secrets may itself be encrypted by an asymmetric-key algorithm. The encrypted data key may be stored and backed up offsite along with the encrypted secrets. During a subsequent restore operation, the data key may be decrypted and then used to decrypt the secrets. Encrypting the secrets with envelope encryption may allow the higher speeds of symmetric encryption to be achieved while retaining the security benefits of asymmetric encryption.

FIG. 1 is a schematic diagram of a computing cluster 100, according to some implementations. The computing cluster 100 includes computing nodes, which may be physical computers, virtual machines, or the like. The computing nodes may include a manager node 102, which is responsible for managing the computing cluster 100, and multiple worker nodes 104 (including a first worker node 104A and a second worker node 104B) within which the components of the computing cluster 100 are adapted to perform a requested cluster operation. Examples of such requested cluster operations can include operations to create an application deployment, delete an application deployment, update an application deployment, and the like. In an example implementation, the computing cluster 100 is a Kubernetes® Cluster.

The manager node 102 is the entry point of administrative tasks for the computing cluster 100 and is responsible for orchestrating the worker nodes 104, within which the components of the computing cluster 100 for generating a cluster operation are located. The manager node 102 includes an API server 106 that provides both the internal and external interface for access to the computing cluster 100 via the manager node 102. The API server 106 receives commands from a management interface 108. The commands may be representational state transfer (REST) command requests. The management interface 108 may be a command line interface tool. The API server 106 processes the commands from the management interface 108, validates the commands, and executes logic specified by the commands.

The results of the commands processed by the API server 106 may be stored in a data store 110. The data store 110 may be a distributed key-value data storage component, such as an etcd data store, which may be included with the manager node 102. The data store 110 stores configuration data of the computing cluster 100, representing the state of the computing cluster 100 (e.g., what pods exist, what pods should be running, which nodes should the pods be running on, etc.). The data store 110 provides storage for the commands received by the API server 106 to perform create-read-update-and-delete (CRUD) operations as well as an interface to register watchers on specific nodes, thereby providing a reliable way to notify the rest of the computing cluster 100 about configuration changes within the computing cluster 100. For example, the information in the data store 110 enables the manager node 102 to be notified about configuration changes such as jobs being scheduled, created, and deployed; pod/service details and states; namespaces and replication information; and the like. As subsequently described in greater detail, secrets for the computing cluster 100 may be stored in the data store 110.

The manager node 102 also includes a resource scheduler 112 and a controller manager 114. The resource scheduler 112 is adapted to deploy pods (and thus applications) onto the worker nodes 104. The resource scheduler 112 includes information regarding available resources on the computing cluster 100, as well as resources utilized for the applications to run. This information is used by the resource scheduler 112 to make decisions about where to deploy a specific application. The controller manager 114 manages controllers of the computing cluster 100. A controller uses the API server 106 to watch the state of one or more resource(s) of the computing cluster 100 and automatically make changes to the computing cluster 100 based on the state of the resource(s). For example, a controller may use the API server 106 to make changes to the current state of the computing cluster 100 to change the current state to another state, re-create a failed pod, remove an extra-scheduled pod, etc. In addition, the manager node 102 may include a DNS server 116, which serves DNS records for the components (e.g., pods and services) of the computing cluster 100. The node agents of the worker nodes 104 may use the DNS server 116 to resolve domain names.

Pods 118 (including first pods 118A and second pods 118B) are run on each of the worker nodes 104. Containers 120 (including first containers 120A and second containers 120B) reside within respective ones of the pods 118. The containers 120 are co-located on respective ones of the worker nodes 104 where the respective pods 118 are running, and may share resources. A pod 118 is a group of containerized components that share resources such as storage, namespaces, control groups, IP addresses, and the like. Each of the pods 118 is assigned an IP address within the computing cluster 100. A pod 118 may include a volume, such as a local disk directory or a network disk, and may expose the volume to the containers 120 within the pod 118. The pods 118 may be managed manually through the API server 106, or the management of the pods 118 may be automatically performed by a controller (managed by the controller manager 114). One or more secret(s) stored in the data store 110 may be made available to a pod 118 via a volume that is exposed to the containers 120 within the pod 118.

The containers 120 include the minimum operating system resources, memory, and dependencies to run an application. Examples of the dependencies include files, environment variables, libraries, and the like. The host operating system for a worker node 104 constrains access of the containers 120 to physical resources of the worker node 104, such as CPUs, storage, memory, and the like. The worker nodes 104 may use virtualization to run the containers 120.

The pods 118 running on a worker node 104 are created, destroyed, and recreated based on the state of the computing cluster 100. Thus, the pods 118 may not be persistent or exist for a long period of time. Because of the relatively short lifespan of the pods 118, the IP address that they are served on may change. To facilitate communication with the pods 118 even when their IP addresses change, a service may be defined for certain pods 118. A service is an abstraction of a group of pods 118, typically using a proxy. A virtual IP address may be assigned to a service in order for other components to communicate with the service via the virtual IP address. Load balancing may be set up for at least some of the pods 118 so that the pods 118 may be exposed via a service. The pods 118 can be recreated and have changes to their corresponding IP protocol without the virtual IP address of the service being changed. Therefore, a service may be created having a stable IP address and DNS name, which can be used by other pods 118 to communicate with the service. For example, consider an back-end which is running with three replicas. Those replicas are fungible, in that a front-end client does not care which back-end replica is used. While the pods 118 that compose the back-end set may change, the front-end clients, by communicating with the back-end via a service, may be unaware of those changes, such that the front-end clients do not keep track of a list of the back-end set. Each service of the containers 120 may be assigned a DNS name that identifies the pods 118 within which the service resides.

Each of the worker nodes 104 includes a node agent 122 (including a first node agent 122A and a second node agent 122B). A node agent 122 is in communication with the manager node 102 and receives details for the configuration of the pods 118 from the API server 106. The node agent 122 uses the received details to ensure that the containers 120 are constructed and running as intended. In addition, the node agent 122 may also receive information about services from the data store 110 to obtain information related to services and to create details related to newly created services.

Additionally, each of the worker nodes 104 includes a proxy 124 (including a first proxy 124A and a second proxy 124B). Each proxy 124 functions as a network proxy, or hub through which requests are transferred, and as a load balancer for a service on a worker node 104 to reverse proxy and distribute network traffic across the containers 120. The proxies 124 are used to increase capacity and reliability of applications and to perform network routing for transmission control protocol (TCP) packets and user data protocol (UDP) packets. The proxies 124 route traffic to the appropriate container 120 in order to enable access to a service based on a virtual IP address of the service. The proxies 124 may also perform numbering of incoming requests, and that information may be used for creating a cluster operation. In this way, the components of the worker nodes 104 may be combined together and identified so that when an application is to be deployed, the components for creating and running the application are located throughout the worker nodes 104. If any of the worker nodes 104 are added or removed, the computing cluster 100 is able to create or deploy the application by combining components from different worker nodes 104 or using a combination of different components within the worker nodes 104.

In order to perform cluster operations in a container management system, a deployment configuration that provides instructions on how to create and update components for performing a cluster operation can be input to the manager node 102 via the management interface 108. Once the instructions on how to create and update the components for performing the cluster operation have been received by the manager node 102, the API server 106 schedules the cluster operation onto the worker nodes 104 to perform the cluster operation using a combination of multiple different components within multiple different containers 120 of multiple different pods 118. In this way, the cluster operation is performed using a combination of components located in multiple containers 120 located within one or more of the pods 118 within one or more of the worker nodes 104.

Once a cluster operation has been scheduled, the manager node 102 monitors the pods 118. If the manager node 102 determines that a resource used for the cluster operation located within one of the containers 120 of the pods 118 goes down or is deleted, the manager node 102 replaces the deleted or nonoperating pod 118 associated with the cluster operation using a different combination of the currently available resources within the containers 120 of the pods 118. In this way, the API server 106 monitors the functionality of the pods 118, and when the pods 118 no longer function as intended, recreates the pod 118.

Secrets for the computing cluster 100 may be stored at the manager node 102. The secrets include sensitive configuration data for the manager node 102, sensitive configuration data for an application deployed on the worker nodes 104, and the like. For example, the secrets may be used by the pods 118 to run an application. The secrets may be objects that are stored in the data store 110, with each secret having a name. The secrets may be encoded (e.g., with base-64 encoding), but may not be encrypted. In other words, the secrets may be stored in the data store 110 as plaintext. In implementations where the computing cluster 100 is a Kubernetes® Cluster, the secrets may be Kubernetes® Secrets.

The components of the computing cluster 100 (e.g., pods, secrets, services, controllers, etc.) may be isolated with namespaces. A namespace is a logical grouping of components of the computing cluster 100. The components in a given namespace are scoped, and may not access components in another namespace. A namespace may be defined and stored in the data store 110. Other objects stored in the data store 110 may be associated with a namespace.

Figure 2:
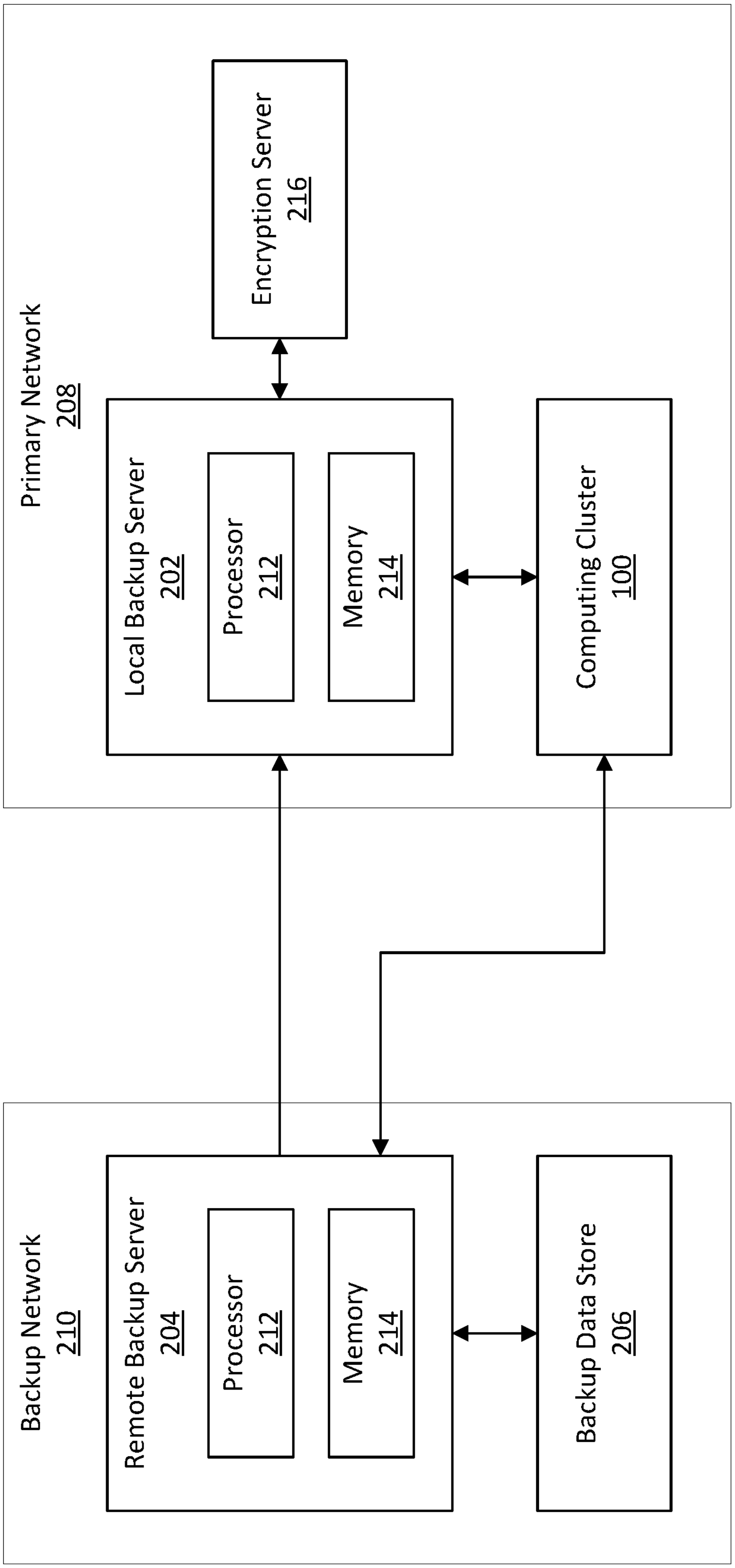
FIG. 2 is a schematic diagram of a computing cluster backup system, according to some implementations.

FIG. 2 is a schematic diagram of a computing cluster backup system 200, according to some implementations. The computing cluster backup system 200 is used to perform offsite, agentless backup of a computing cluster 100. Components of the computing cluster backup system 200 are split across multiple networks.

The computing cluster backup system 200 includes a local backup server 202, a remote backup server 204, a backup data store 206. The local backup server 202 and the computing cluster 100 are part of a first network, e.g., a primary network 208. The remote backup server 204 and the backup data store 206 are part of a second network, e.g., a backup network 210, which is separate from the first network. Specifically, the backup network 210 may be in a different geographic location than the primary network 208. The primary network 208 may be a virtual private cloud (VPC) for a customer of a cloud provider.

As subsequently described in greater detail, secrets of the computing cluster 100 will be backed up at the backup data store 206 in the backup network 210. Thus, the secrets will be backed up offsite from the primary network 208. Because the backup data store 206 and the computing cluster 100 are in different networks, the backup may be logically air-gapped. Additionally, the offsite backup will be performed by the remote backup server 204 and the local backup server 202, together, so as to avoid the use of a backup agent on the computing cluster 100. The offsite backup may thus be agentless, such that no backup agent (e.g., controller or operator) needs to run on the computing cluster 100.

The backup servers (e.g., the local backup server 202 and the remote backup server 204) may each include suitable components. Suitable components include a processor, an application-specific integrated circuit, a microcontroller, memory, and the like. The backup servers may be physical computing devices, virtual machines, or the like. For example, each backup server may include a processor 212 and a memory 214. The memory 214 may be a non-transitory computer readable medium storing instructions for execution by the processor 212. One or more modules within the computing cluster backup system 200 may be partially or wholly embodied as software and/or hardware for performing any functionality described herein.

The backup data store 206 may be used to store remote backups of the computing cluster 100. The backup data store 206 may be a suitable file store, key-value store, or the like. The backup data store 206 may be part of the remote backup server 204 (e.g., stored on a memory of the remote backup server 204) or may be separate from the remote backup server 204 (e.g., may be a file server accessible to the remote backup server 204).

During a backup operation, the remote backup server 204 sends a backup request to the local backup server 202. The backup request may include a description of the computing cluster 100 that should be backed up. In response to receiving the backup request, the local backup server 202 obtains desired secrets from the computing cluster 100 in plaintext, encrypts the plaintext secrets, and temporarily stores the encrypted secrets back in the computing cluster 100. The remote backup server 204 then retrieves the encrypted secrets from the computing cluster 100, and persists the encrypted secrets in the backup data store 206. Thus, the encrypted secrets (and not the plaintext secrets) are stored offsite, in the backup data store 206.

During a restore operation, the remote backup server 204 temporarily stores encrypted secrets in the computing cluster 100. The remote backup server 204 then sends a restore request to the local backup server 202. The restore request may include a description of the computing cluster 100 that should be restored. In response to receiving the restore request, the local backup server 202 obtains the encrypted secrets from the computing cluster 100, decrypts the encrypted secrets to plaintext, and persists the plaintext secrets back in the computing cluster 100.

Envelope encryption may be used to encrypt the secrets. In some implementations where envelope encryption is used, the computing cluster backup system 200 further includes an encryption server 216 in the primary network 208. The encryption server 216 may include suitable components, which may be similar to the backup servers. The secrets may be encrypted by the local backup server 202 with a symmetric-key algorithm. The data key used to encrypt the secrets may be encrypted by the encryption server 216 with an asymmetric-key algorithm. The encrypted data key may be stored in the computing cluster 100 with the encrypted secrets by the local backup server 202. The remote backup server 204 then retrieves the encrypted data key along with the encrypted secrets from the computing cluster 100, and stores the encrypted data key and secrets in the backup data store 206.

The primary network 208 and the backup network 210 may each be a public cloud (which may be publicly accessible) or a private cloud (which may not be publicly accessible). For example, the primary network 208 may be a first public cloud, while the backup network 210 may be a second public cloud, a private cloud, or a virtual private cloud (VPC). In an example implementation, the backup network 210 is part of HPE® Greenlake, the primary network 208 is part of Amazon® Web Services (AWS), the instructions executed on the local backup server 202 (e.g., for backup/restore operations) are functions run on AWS Lambda, and the encryption server 216 is part of AWS Key Management Service.

Figure 3:
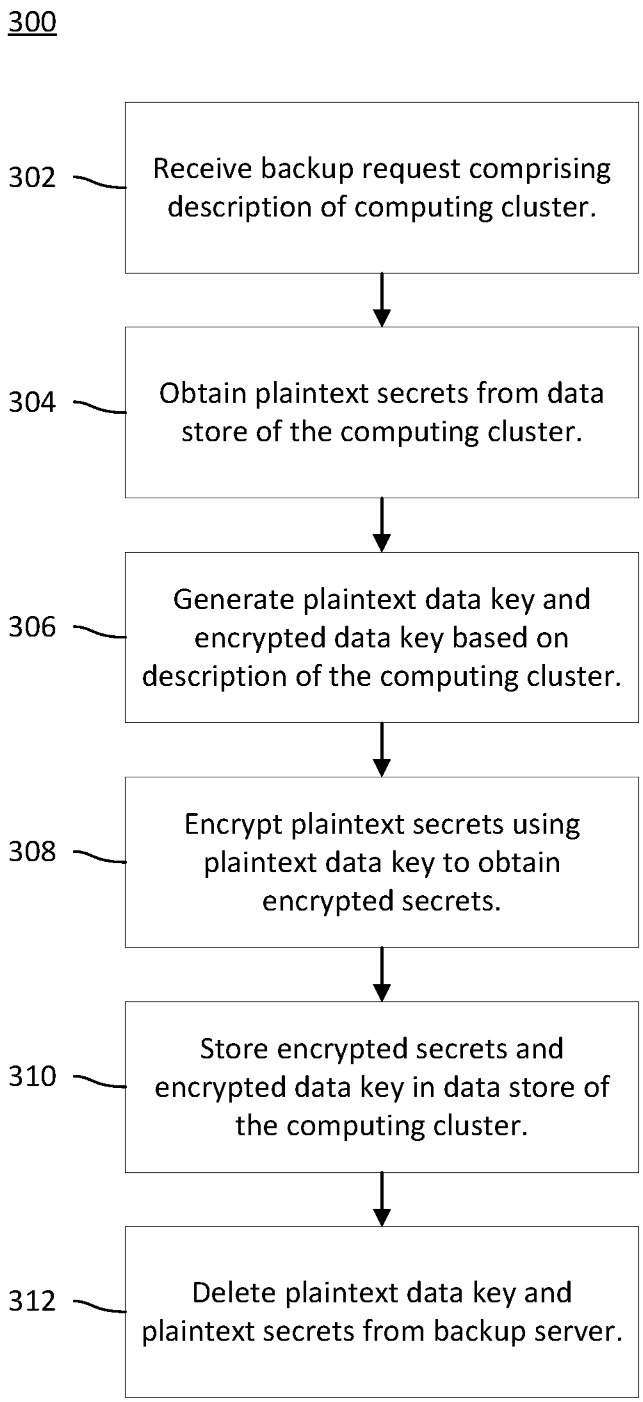
FIG. 3 is a diagram of a local cluster backup method, according to some implementations.

FIG. 3 is a diagram of a local cluster backup method 300, according to some implementations. The local cluster backup method 300 will be described in conjunction with FIGS. 1-2. The local cluster backup method 300 may be performed by the local backup server 202 during a backup operation.

The local backup server 202 performs a step 302 of receiving a backup request from the remote backup server 204. The backup request includes a description of a computing cluster 100 from which secrets should be backed up. The backup request may also include other information, such as a backup identifier and/or a name of a target namespace of the computing cluster 100 for the backup operation. When the backup request includes a name of a target namespace, each of the secrets in that namespace may be backed up. The backup identifier may be a unique identifier generated by the remote backup server 204.

The local backup server 202 performs a step 304 of obtaining plaintext secrets from the data store 110 of the computing cluster 100. For example, the plaintext secrets may be obtained from the data store 110 via the API server 106 of the computing cluster 100. The local backup server 202 may send command(s) to the API server 106, and the API server 106 may return the plaintext secrets in response to the command(s). As previously noted, the plaintext secrets are used by the pods 118. When the backup request includes a name of a target namespace, the plaintext secrets may be the secrets stored in that target namespace, which may be used by the pods 118 running in that target namespace. Thus, the plaintext secrets may be obtained from the target namespace. The plaintext secrets may be encoded (e.g., with base-64 encoding), but may not be encrypted at this step.

The local backup server 202 performs a step 306 of generating a plaintext data key and an encrypted data key. The data keys may be generated based on the description of the computing cluster 100 in the backup request. For example, the description of the computing cluster 100 may be used to look up a cluster identifier that is unique to the computing cluster 100, such as via a cluster endpoint that is used to administer the computing cluster 100. The cluster identifier may be a public encryption key for the computing cluster 100, a resource name for the computing cluster 100, or the like. The data keys may then be generated using the cluster identifier. The plaintext data key will be subsequently used to encrypt the secrets. In implementations where envelope encryption is used, the plaintext data key is a symmetric data key, and the encrypted data key is a copy of the plaintext data key that is encrypted with an asymmetric-key algorithm.

The encryption server 216 may be used to generate the plaintext data key and the encrypted data key for the local backup server 202. For example, the local backup server 202 may send a first key request to the encryption server 216, requesting that the encryption server 216 generate the plaintext data key and the encrypted data key, each of which may be unique to the cluster identifier. The first key request includes the cluster identifier for the computing cluster 100. The encryption server 216 may return the plaintext data key and the encrypted data key in response to the first key request.

The local backup server 202 performs a step 308 of encrypting the plaintext secrets (obtained in step 304) using the plaintext data key (generated in step 306). Encrypted secrets are obtained by encrypting the plaintext secrets. In implementations where envelope encryption is used, the secrets are encrypted by encrypting the plaintext secrets with a symmetric-key algorithm using the plaintext data key.

The local backup server 202 performs a step 310 of storing the encrypted secrets and the encrypted data key in the data store 110 of the computing cluster 100. Specifically, the encrypted secrets and the encrypted data key are temporarily stored in the computing cluster 100, for subsequent retrieval by the remote backup server 204. The encrypted secrets and the encrypted data key may be stored in the data store 110 via the API server 106. The local backup server 202 may send command(s) to the API server 106, which command(s) include the encrypted secrets and the encrypted data key for storage in the data store 110.

In some implementations, the encrypted secrets and the encrypted data key are stored in a backup namespace of the computing cluster 100. The backup namespace may be a temporary namespace, in which the encrypted copy of the secrets and data key will be temporarily stored. When the remote backup server 204 subsequently retrieves the encrypted secrets and the encrypted data key from the data store 110, it may do so by looking for them in the backup namespace. Before storing the encrypted secrets and the encrypted data key, the local backup server 202 may perform an optional step of creating a backup namespace in the computing cluster 100. The local backup server 202 may create the backup namespace by sending command(s) to the API server 106. The backup namespace may be named based on the backup identifier. For example, the name of the backup namespace may be generated by concatenating the backup identifier and a current timestamp. The name of the backup namespace may be generated by the remote backup server 204 and included with the backup request, or may be generated by the local backup server 202.

The encrypted secrets and the encrypted data key may be included in objects that are stored in the data store 110. For example, the encrypted secrets may be stored in respective key-value objects, along with the encrypted data key. Each plaintext secret may be encrypted using the plaintext data key, and the encrypted secret may be stored in a key-value object along with the encrypted data key. The key-value object may then be stored in the data store 110. The name of the key-value object is generated based on the name of the secret that was encrypted and stored in the key-value object. For example, the name of the key-value object may be generated by concatenating the secret's name, the backup identifier, and the namespace of the secret (e.g., the target namespace). The backup identifier and the name of the target namespace may be included with the backup request, and the name of the key-value object may be generated by the local backup server 202. In implementations where the computing cluster 100 is a Kubernetes® Cluster, the key-value objects may be Kubernetes ConfigMaps.

The local backup server 202 performs a step 312 of deleting its local copy of the plaintext data key and the plaintext secrets. For example, the plaintext data key and the plaintext secrets may be deleted from the memory 214 of the local backup server 202.

Figure 4:
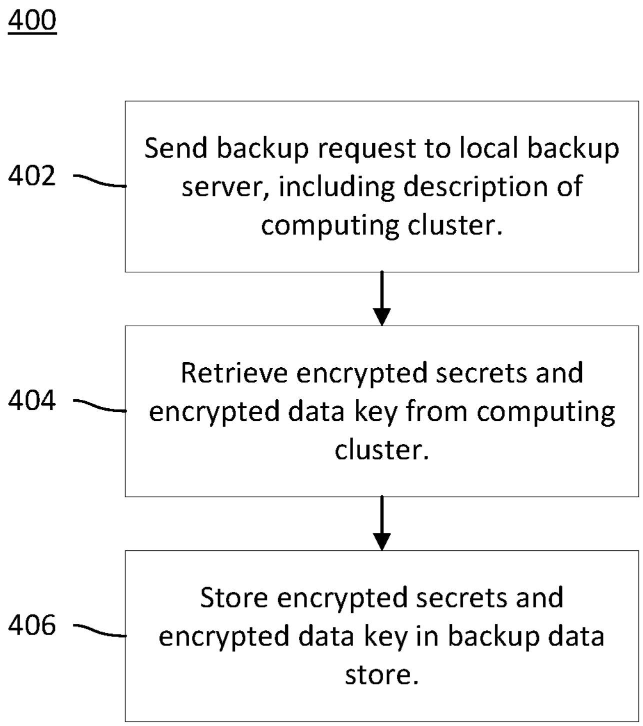
FIG. 4 is a diagram of a remote cluster backup method, according to some implementations.

FIG. 4 is a diagram of a remote cluster backup method 400, according to some implementations. The remote cluster backup method 400 will be described in conjunction with FIGS. 1-2. The remote cluster backup method 400 may be performed by the remote backup server 204 during a backup operation.

The remote backup server 204 performs a step 402 of sending a backup request to the local backup server 202. The backup request may include a description of a computing cluster 100 that should be backed up by the local backup server 202. In implementations where the encrypted secrets and the encrypted data key are to be stored in a backup namespace, the remote backup server 204 may generate the name of the backup namespace and include that name with the backup request. Sending the backup request to the local backup server 202 triggers the local backup server 202 to perform the local cluster backup method 300, as previously described. After the local backup server 202 completes the local cluster backup method 300, the encrypted secrets and the encrypted data key are stored in the data store 110 of the computing cluster 100.

The remote backup server 204 performs a step 404 of retrieving the encrypted secrets and the encrypted data key from the data store 110 of the computing cluster 100. The encrypted secrets and the encrypted data key may be retrieved from the data store 110 via the API server 106. The remote backup server 204 may send command(s) to the API server 106, and the API server 106 may return the encrypted secrets and the encrypted data key in response to the command(s).

In implementations where the encrypted secrets and the encrypted data key are stored in a backup namespace, the remote backup server 204 may watch for the creation and population of that backup namespace in the computing cluster 100, via the API server 106. In response to detecting the creation and population of the backup namespace (with the encrypted secrets and the encrypted data key), the remote backup server 204 may retrieve the encrypted secrets and the encrypted data key from the computing cluster 100.

The remote backup server 204 performs a step 406 of storing the encrypted secrets and the encrypted data key in the backup data store 206. When the encrypted secrets and the encrypted data key are stored in key-value objects, and the backup data store 206 includes a key-value store, the key-value objects may be stored in the key-value store. The key-value objects may also be stored in a database table, when the backup data store 206 includes a relational database. The name of the backup namespace (if used) may also be stored with the encrypted secrets and the encrypted data key in the backup data store 206.

Figure 5:
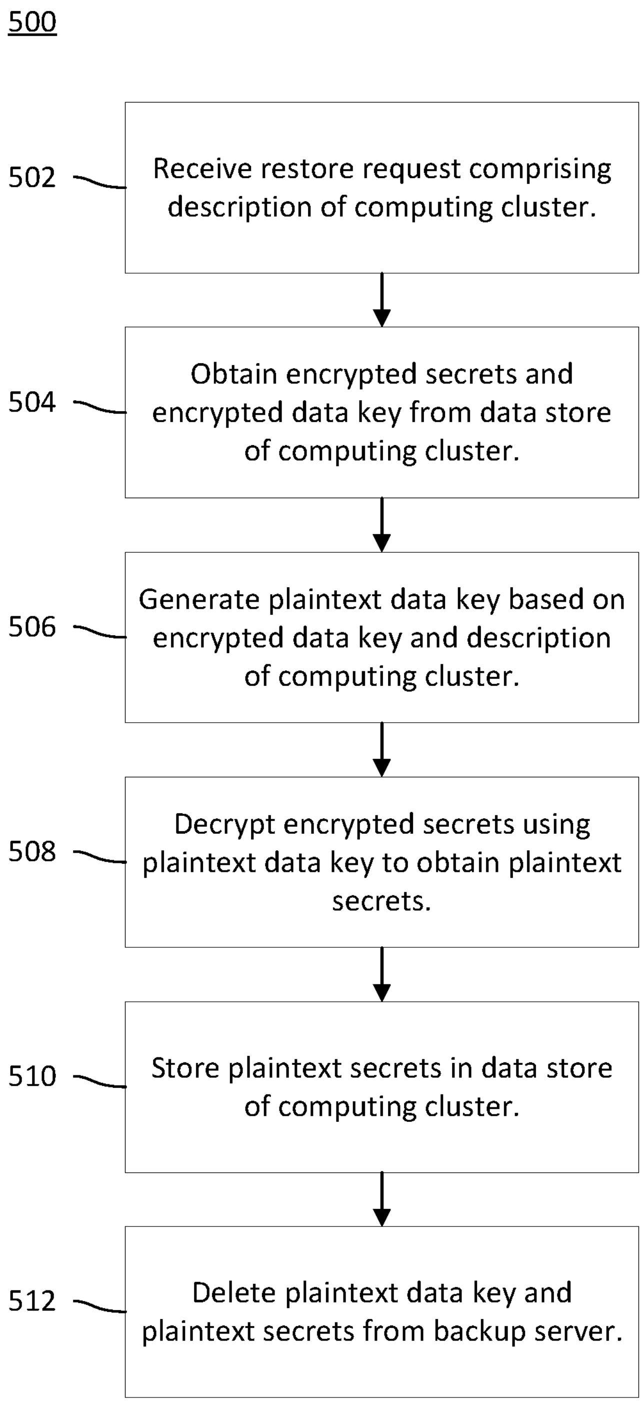
FIG. 5 is a diagram of a local cluster restore method, according to some implementations.

FIG. 5 is a diagram of a local cluster restore method 500, according to some implementations. The local cluster restore method 500 will be described in conjunction with FIGS. 1-2. The local cluster restore method 500 may be performed by the local backup server 202 during a restore operation.

The local backup server 202 performs a step 502 of receiving a restore request from the remote backup server 204. The restore request may include a description of a computing cluster 100 to which secrets should be restored. The restore request may also include other information, such as a backup identifier and/or a name of a target namespace of the computing cluster 100 for the restore operation.

The local backup server 202 performs a step 504 of obtaining encrypted secrets and an encrypted data key from a data store 110 of the computing cluster 100. Specifically, and as subsequently described in greater detail, the encrypted secrets and the encrypted data key may be temporarily stored in the computing cluster 100 by the remote backup server 204, and the local backup server 202 may retrieve the encrypted secrets and the encrypted data key from that temporary storage. For example, the encrypted secrets and the encrypted data key may be obtained from the data store 110 via the API server 106 of the of the computing cluster 100. The local backup server 202 may send command(s) to the API server 106, and the API server 106 may return the encrypted secrets and the encrypted data key in response to the command(s).

In some implementations, the encrypted secrets and the encrypted data key are stored in a backup namespace of the computing cluster 100. The backup namespace may be a temporary namespace, in which an encrypted copy of the secrets and data key was temporarily stored by the remote backup server 204. The name of the backup namespace may be included with the restore request, and the encrypted secrets and the encrypted data key may be retrieved from that backup namespace.

The local backup server 202 performs a step 506 of generating a plaintext data key. The plaintext data key may be generated based on the encrypted data key and (optionally) the description of the computing cluster 100. For example, the description of the computing cluster 100 may be used to look up a cluster identifier that is unique to the computing cluster 100 (previously described). The plaintext data key may then be generated by decrypting the encrypted data key using the cluster identifier. Thus, the plaintext data key is a decrypted copy of the encrypted data key. The plaintext data key will be subsequently used to decrypt the secrets. In implementations where envelope encryption is used, the plaintext data key is a copy of the encrypted data key that is decrypted with an asymmetric-key algorithm.

The encryption server 216 may be used to generate the plaintext data key by decrypting the encrypted data key for the local backup server 202. For example, the local backup server 202 may send a second key request to the encryption server 216, requesting that the encryption server 216 decrypt the encrypted data key. The second key request includes the encrypted data key and the cluster identifier for the computing cluster 100. The encryption server 216 may return the plaintext data key in response to the second key request.

The local backup server 202 performs a step 508 of decrypting the encrypted secrets (obtained in step 504) using the plaintext data key (obtained in step 506). Plaintext secrets are obtained by decrypting the encrypted secrets. In implementations where envelope encryption is used, the secrets are decrypted by decrypting the plaintext secrets with a symmetric-key algorithm using the plaintext data key. The same symmetric-key algorithm may be used to encrypt and decrypt the secrets.

As previously noted, the encrypted secrets may be stored in key-value objects. Specifically, the encrypted secrets and the encrypted data key may be stored in key-value objects. Decrypting the encrypted secrets may include, for each key-value object, decrypting the value of the object using the plaintext data key.

The local backup server 202 performs a step 510 of storing the plaintext secrets in the data store 110 of the computing cluster 100. The encrypted secrets and the encrypted data key may be stored in the data store 110 via the API server 106. The local backup server 202 may send command(s) to the API server 106, which command(s) include the plaintext secrets for storage in the data store 110. The plaintext secrets may be applied to the computing cluster 100, so that the computing cluster 100 begins using the secrets for applications/cluster operations.

As previously noted, the encrypted secrets may be stored in key-value objects, where the names of the key-value objects include the namespace of the secrets (e.g., the target namespace). When the secrets are applied to the computing cluster 100, they may be applied to the target namespace from in the names of the key-value objects.

The local backup server 202 performs a step 512 of deleting its local copy of the plaintext data key and the plaintext secrets. For example, the plaintext data key and the plaintext secrets may be deleted from the memory 214 of the local backup server 202.

Figure 6:
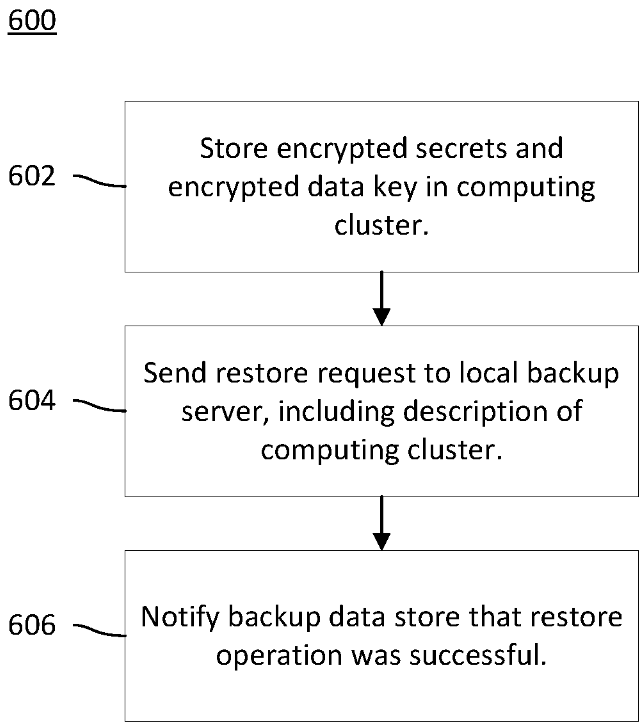
FIG. 6 is a diagram of a remote cluster restore method, according to some implementations.

FIG. 6 is a diagram of a remote cluster restore method 600, according to some implementations. The remote cluster restore method 600 will be described in conjunction with FIGS. 1-2. The remote cluster restore method 600 may be performed by the remote backup server 204 during a restore operation.

The remote backup server 204 performs a step 602 of storing encrypted secrets and an encrypted data key in a data store 110 of a computing cluster 100. The encrypted secrets and the encrypted data key may be stored in the data store 110 via the API server 106. The remote backup server 204 may send command(s) to the API server 106, including the encrypted secrets and the encrypted data key. In some implementations, the encrypted secrets and the encrypted data key are temporarily stored in a backup namespace of the computing cluster 100.

The remote backup server 204 performs a step 604 of sending a restore request to the local backup server 202. The restore request may include a description of a computing cluster 100 that should be restored by the local backup server 202. In implementations where the encrypted secrets and the encrypted data key are stored in a backup namespace, the restore request may include the name of the backup namespace. Sending the restore request to the local backup server 202 triggers the local backup server 202 to perform the local cluster restore method 500, as previously described. After the local backup server 202 completes the local cluster restore method 500, the restored secrets are applied to the computing cluster 100.

The remote backup server 204 performs a step 606 of notifying the backup data store 206 that the restore operation was successful. In some implementations, the backup data store 206 includes a database storing a record indicating a status of the restore operation. The status of that record may be updated to indicate the restore operation was successful.

Embodiments may achieve advantages. Utilizing the remote and local backup servers allows secrets to be backed up from and restored to the computing cluster 100 without running an agent on the computing cluster 100. As a result, cluster data backup and restoration may be agentless, which may simplify administration of the computing cluster 100. Further, by encrypting the secrets locally using the local backup server, encrypted secrets (and not plaintext secrets) may be backed up offsite. The security of the backup system may thus be improved.

The foregoing outlines features of several examples so that those skilled in the art may better understand the aspects of the present disclosure. Various modifications and combinations of the illustrative examples, as well as other examples, will be apparent to persons skilled in the art upon reference to the description. It is therefore intended that the appended claims encompass any such modifications.

What is claimed is:

1. A system comprising:

a computing cluster in a first network, the computing cluster comprising computing nodes, the computing nodes comprising worker nodes and a manager node, the worker nodes running pods deployed by the manager node, the manager node running a data store, the data store comprising plaintext secrets that are used by the pods; and a local backup server in the first network, the local backup server being separate from the manager node, the local backup server being separate from the worker nodes, wherein the local backup server operates independently of the computing cluster, the local backup server configured to:

receive a backup request from a remote backup server in a second network;

obtain the plaintext secrets from the data store of the manager node;

generate a plaintext data key and an encrypted data key based on a description of the computing cluster, the plaintext data key being a symmetric data key, the encrypted data key being a copy of the plaintext data key that is encrypted with an asymmetric-key algorithm;

encrypt the plaintext secrets using the plaintext data key to obtain encrypted secrets; and store the encrypted secrets and the encrypted data key in the data store of the manager node.

2. The system of claim 1, further comprising:

a backup data store in the second network, the second network separate from the first network; and the remote backup server in the second network, the remote backup server configured to:

send the backup request to the local backup server;

retrieve the encrypted secrets and the encrypted data key from the data store of the manager node; and store the encrypted secrets and the encrypted data key in the backup data store.

3. The system of claim 2, wherein the local backup server stores the encrypted secrets and the encrypted data key in a backup namespace of the computing cluster, and the remote backup server retrieves the encrypted secrets and the encrypted data key in response to detecting creation and population of the backup namespace with the encrypted secrets and the encrypted data key.

4. The system of claim 1, further comprising:

an encryption server in the first network, the encryption server configured to generate the plaintext data key and the encrypted data key for the local backup server.

5. The system of claim 1, wherein the manager node also runs an API server, and the local backup server obtains the plaintext secrets from the data store of the manager node via the API server.

6. The system of claim 1, wherein the backup request comprises a target namespace of the computing cluster, and the local backup server stores the encrypted secrets in the data store by storing key-value objects in the data store, names of the key-value objects comprising the target namespace.

7. A method comprising:

receiving, by a backup server from a remote server, a backup request comprising a description of a computing cluster, the computing cluster comprising computing nodes, the computing nodes comprising worker nodes and a manager node, the worker nodes running pods deployed by the manager node, the manager node running a data store, the data store comprising plaintext secrets that are used by the pods, the backup server being separate from the manager node, the backup server being separate from the worker nodes, wherein the backup server operates independently of the computing cluster;

obtaining, by the backup server, the plaintext secrets from the data store of the manager node;

generating, by the backup server, a plaintext data key and an encrypted data key based on the description of the computing cluster, the plaintext data key being a symmetric data key, the encrypted data key being a copy of the plaintext data key that is encrypted with an asymmetric-key algorithm;

encrypting, by the backup server, the plaintext secrets using the plaintext data key to obtain encrypted secrets; and storing, by the backup server, the encrypted secrets and the encrypted data key in the data store of the manager node.

8. The method of claim 7, further comprising:

deleting, by the backup server, the plaintext data key and the plaintext secrets from a memory of the backup server.

9. The method of claim 7, wherein encrypting the plaintext secrets comprises encrypting the plaintext secrets with a symmetric-key algorithm.

10. The method of claim 7, wherein the backup request further comprises a target namespace of the computing cluster, the worker nodes run the pods in the target namespace, and the plaintext secrets are obtained from the target namespace.

11. The method of claim 7, further comprising:

creating, by the backup server, a backup namespace of the computing cluster, wherein the encrypted secrets and the encrypted data key are stored in the backup namespace.

12. The method of claim 11, wherein the backup request comprises the backup namespace.

13. The method of claim 7, wherein generating the plaintext data key and the encrypted data key based on the description of the computing cluster comprises:

looking up a cluster identifier that is unique to the computing cluster using the description of the computing cluster; and sending a key request to an encryption server, the key request comprising the cluster identifier.

14. A method comprising:

receiving, by a backup server from a remote server, a restore request comprising a description of a computing cluster, the computing cluster comprising computing nodes, the computing nodes comprising worker nodes and a manager node, the worker nodes running pods deployed by the manager node, the manager node running a data store, the backup server being separate from the manager node, the backup server being separate from the worker nodes, wherein the backup server operates independently of the computing cluster;

obtaining, by the backup server, encrypted secrets and an encrypted data key from the data store of the manager node;

generating, by the backup server, a plaintext data key based on the encrypted data key and the description of the computing cluster, the plaintext data key being a symmetric data key, the plaintext data key being a copy of the encrypted data key that is decrypted with an asymmetric-key algorithm;

decrypting, by the backup server, the encrypted secrets using the plaintext data key to obtain plaintext secrets; and storing, by the backup server, the plaintext secrets in the data store of the manager node, the plaintext secrets being used by the pods.

15. The method of claim 14, further comprising:

deleting, by the backup server, the plaintext data key and the plaintext secrets from a memory of the backup server.

16. The method of claim 14, wherein decrypting the encrypted secrets comprises decrypting the encrypted secrets with a symmetric-key algorithm.

17. The method of claim 14, wherein the restore request comprises a backup namespace of the computing cluster, and the encrypted secrets and the encrypted data key are obtained from the backup namespace.

18. The method of claim 14, wherein generating the plaintext data key based on the encrypted data key and the description of the computing cluster comprises:

looking up a cluster identifier that is unique to the computing cluster using the description of the computing cluster; and sending a key request to an encryption server, the key request comprising the encrypted data key and the description of the computing cluster.

19. The system of claim 1, wherein the computing cluster does not run a backup agent.

20. The system of claim 1, wherein the backup request comprises the description of the computing cluster.

* * * * *